May 10, 1938.  G. F. PAUL  2,117,009
APPARATUS FOR AND METHOD OF DISPOSING OF CROP ENDS IN STRIP MILLS
Filed March 13, 1937　　2 Sheets-Sheet 1
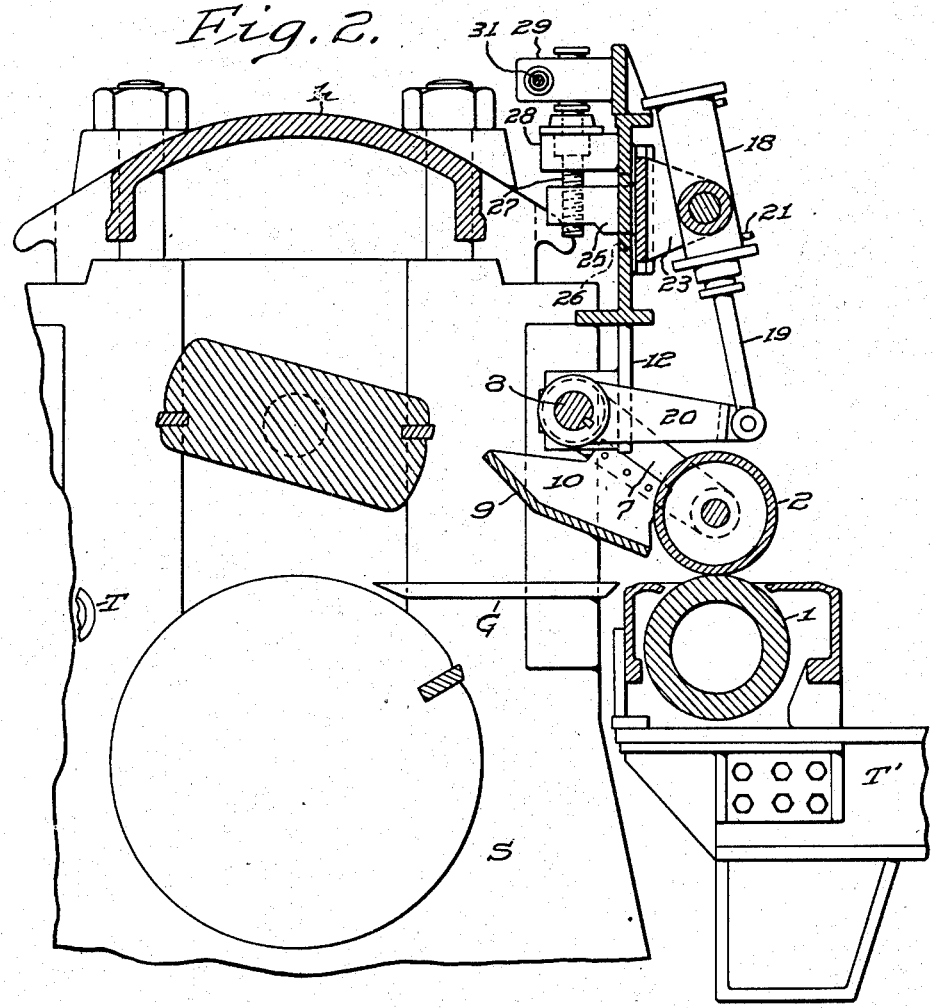
INVENTOR
George F. Paul.
WITNESS
BY
ATTORNEY May 10, 1938.  G. F. PAUL  2,117,009
APPARATUS FOR AND METHOD OF DISPOSING OF CROP ENDS IN STRIP MILLS
Filed March 13, 1937  2 Sheets-Sheet 2

INVENTOR
George F. Paul.

WITNESS

BY

ATTORNEY

UNITED STATES PATENT OFFICE 2,117,009

APPARATUS FOR AND METHOD OF DISPOSING OF CROP ENDS IN STRIP MILLS

George F. Paul, Struthers, Ohio

Application March 13, 1937, Serial No. 130,685

18 Claims. (Cl. 164—68)

This invention relates to strip mills and primarily to means for and method of disposing of the crop ends severed from the strip subsequent to its passage through the mill rolls and prior to its being coiled or otherwise treated, and is especially useful when employed in association with a flying or other shear adapted to cut the strip while it is moving since under these conditions it enables the severed front crop end to be readily and promptly removed from the path followed by the strip in its passage to the coiler or other receiving mechanism beyond the run-out table.

The purpose of my invention, moreover, may be advantageously utilized to control the movement of the strip itself, after removal of its front crop end, between the last stand of rolls and the receiving mechanism to which the strip is being directed and may also be used for disposing of the rear crop end with a minimum of effort.

In rolling strips on continuous or other mills with which the apparatus of my invention may be used to advantage, it is customary to cut off the ragged leading and trailing ends of the strip by means of a suitable shear, conveniently of the "flying" type, positioned between the last stand of mill rolls and the run-out table and to provide a pit to receive the crop ends adjacent the shear, or else to station operatives alongside the run-out table over which the crop ends and strip are conducted after passing the shear to manually remove the crop ends from the path of the strip. But these methods are unsatisfactory in that when a pit is provided adjacent the shear it is difficult to insure that the crop ends are properly deposited therein and the leading end of the strip itself prevented from entering it as well, while the manual removal of the crop ends from the table is dangerous and involves heavy labor costs and may result in damage to the strip and/or loss of time in the operation of the mill because of the speed at which the crop ends and the strip pass along the table.

A principal object of the invention, therefore, is the provision of means adapted for disposition adjacent the path of travel of a moving strip after it leaves the last stand of rolls in the mill in which it is progressively formed operable to remove from that path small portions of the strip, such as the severed crop ends, without retarding or otherwise interfering with the travel of the main portion of the strip.

A further object is the provision of such means which, in addition, may be operated to facilitate the movement of the main portion of the strip to insure its being fed to the coiling mechanism or the like without injury even though the work rolls deliver the strip at a linear speed greater than that at which it is taken up by the coiling mechanism.

Another object is the provision of mechanism for association with a strip shear and run-out table including a pair of pinch rolls and means for driving them at a higher peripheral speed than that of the table rollers, with means for easily and quickly regulating their spacing so as to bring them into position for positively moving the strip, or portions thereof, or to separate them so as to allow the strip to pass relatively freely between them.

A still further object is to provide in association with the mechanism aforesaid, means for directing a crop end of a moving strip into a pit or the like lying outside the path of the strip which are operable to exclude the latter from the pit after the crop end has been deposited therein.

Still another object of the invention is to provide a novel method of discharging crop ends from the run-out tables of strip mills in accordance with which the crop end, after it is sheared from the strip, is projected forwardly along the table at a lineal speed greater than the lineal speed of the main portion of the strip toward a station at which it is removed from the path of the strip prior to the arrival there of the leading end of the latter.

Other objects, purposes and advantages of the invention will be understood or will more fully appear from the following description of apparatus constructed in accordance therewith and shown in the accompanying drawings in association with a rotary flying shear and other equipment forming parts of a continuous strip mill of a well known type.

In the said drawings:

Fig. 1 is a fragmentary diagrammatic side elevation of the said apparatus, mill and shear.

Fig. 2 is a vertical section on a larger scale of the crop end pinch rolls and associated parts with the flying shear indicated diagrammatically as in Fig. 1.

In the several figures like characters are used to designate the same parts.

Referring more particularly to the drawings it will be understood that the parts of the mill, as distinguished from those of the mechanism of my invention, are conventionally illustrated as representative of a type of mill with which said mechanism may be conveniently associated for performance of its intended functions and are therefore shown and described merely to facilitate disclosure of the invention which is not to be considered as thereby limited in its application, functions or utility, to association with any particular type of mill or other mechanism of specific character.

Thus in Fig. 1 rolls R represent the last stand of work rolls in a continuous mill having a table T for supporting the rolled strip on the exit side of these rolls, a rotary flying shear S operable to shear the moving strip when desired during its passage between the shear heads, and a run-out table T' comprising driven rollers r which carry the strip to coiling mechanism or the like (not shown).

The principal unit of the mechanism of my invention is interposed between the shear S and table T' and is separated from the former by a guide table G while a subordinate unit of said mechanism is inserted in table T' at a point some distance farther removed from the shear and replaces a part of that table. The first of these units, which may be termed the impelling unit to distinguish it from the other or receiving unit, whose principal function is to remove the crop ends from the run-out table, comprises essentially a pair of pinch rolls 1, 2, the first of which is preferably similar to and mounted in alignment with the conveyor rollers r of the table T' but is driven by any suitable means (not shown) at a higher speed than the latter through gears 3. This roll may be supported on suitable bearings from table T' or in any other convenient way as long as it is maintained in substantial parallel alignment with rollers r and thus constitutes in effect an extension of table T' toward shear S.

Figure 3:
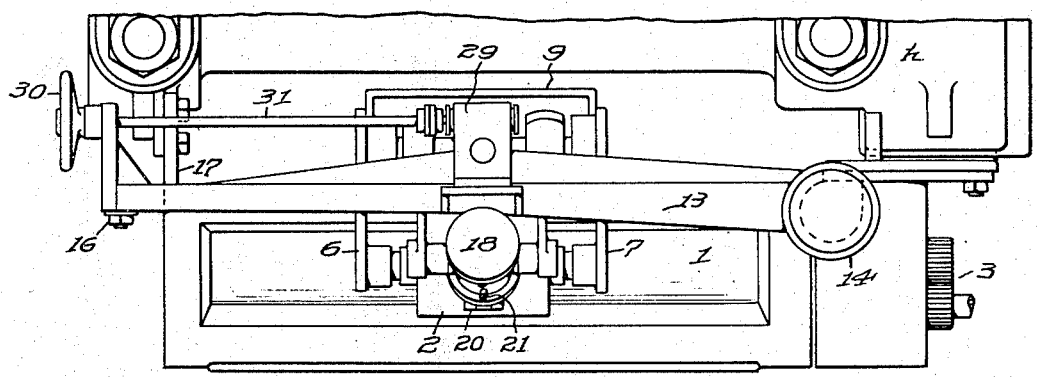
Fig. 3 is a fragmentary top plan view of the mechanism shown in Fig. 2.
Figure 4:
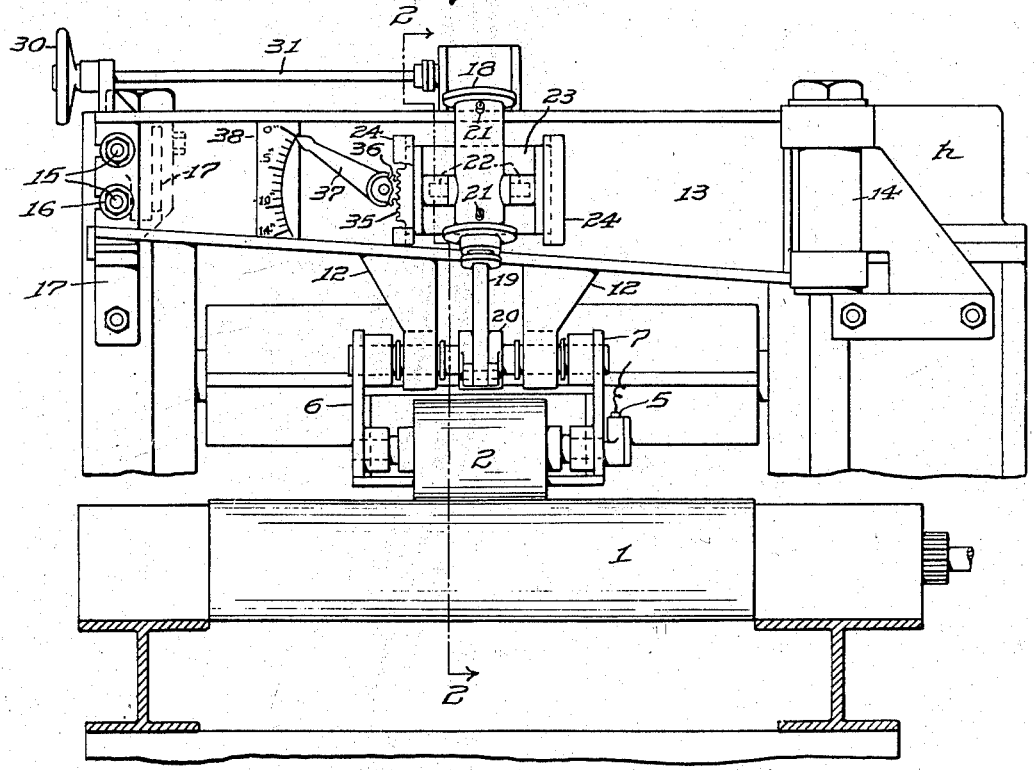
Fig. 4 is a front elevation of said mechanism, in which the principal planes of section of Fig. 2 are indicated by the line 2—2.

The upper roll 2, which may desirably be self-driven by an electric motor within the roll, and not shown, supplied by current through connector 5, is journaled at its ends in a pair of parallel arms 6, 7 keyed or otherwise secured to a rotatable shaft 8 extending parallel to the roll axis. As shown in Figs. 3 and 4 roll 2 is usually made considerably shorter than roll 1, but should in any case be long enough to give a good bearing on the strip, and an angular guide 9 is positioned behind pinch rolls 1, 2 to direct the moving strip between them and provided with upstanding arms 10 secured to arms 6, 7 respectively to maintain it in proper position.

The shaft 8 is journaled in brackets 12 depending from a transverse beam 13 which is supported at one end on a hinge connection 14 with one side of the shear housing h and at the other end by bolts 15, carrying nuts 16, extending through slots in the end of the beam and projecting from a bracket 17 secured to the opposite side of the shear housing. This mode of supporting beam 13 is convenient in that the necessity for providing independent supporting structure is eliminated, while the beam can readily be swung outwardly on its hinge connection 14 after release of nuts 16 to obtain access to the shear, as for the purpose of changing its knives, but of course beam 13 may be otherwise supported if desired.

The roll 2 thus can be swung on shaft 8 toward and away from roll 1, and this operation is mechanically effected by mechanism comprising a cylinder 18, the piston rod 19 of which is connected with an arm 20 keyed to shaft 8 and projecting outwardly from it above roll 1, connections 21 from cylinder to a source of fluid under pressure enabling the operator, through manipulation of suitable valves (not shown) to control the passage of air or other actuating fluid to and from the cylinder to raise and lower its piston and hence roll 2 as desired. To permit entire freedom of action of the cylinder 18 it is mounted on trunnions 22 carried by a yoke 23, and the latter is slidable in ways 24 secured to the front face of the beam 13 to permit vertical adjustment of the cylinder to insure proper spacing of roll 1 above roll 2 when the piston is at the bottom of its travel. To this end a lug 25 projects rearwardly from yoke 23 through a slot 26 in the beam 13 and is bored and threaded to receive a screw 27 rotatably carried in a boss 28 on the back face of the beam for actuation through a worm and pinion in a gear box 29 by hand wheel 30 mounted on the worm shaft 31 whereby screw 27 can be manually rotated to raise or lower yoke 23.

In Fig. 4 one edge of yoke 23 is shown as provided with rack teeth 35 and these mesh with a gear sector 36 connected with an indicator or pointer 37 which thus moves across the graduated dial quadrant 38 mounted on beam 13 so that the adjustment of the yoke, and hence the spacing of rolls 1 and 2 when the piston in cylinder 18 is at the bottom of its travel, can be read directly from the dial which, in Fig. 4, is shown as graduated to represent units of a tenth of an inch in the roll spacing.

The receiving unit to which reference has been made, which is shown only in Fig. 1, comprises a hinged trap or leaf 40 supported on a horizontal pivot 41 extending transversely of table T' about which the trap can be swung upwardly into the path of an object, such as a crop end, moving along the table or lowered to permit the object to pass over it, and is provided at its free edge with a guide roller 42 which facilitates the movement of the crop end into the subjacent space 43 when the trap is raised, this space thus constituting a crop end pit to which the crop ends of strips are delivered during operation of the mill. The mechanism for raising and lowering trap 40 comprises an actuating cylinder 44 mounted on trunnions 45 journaled in any suitable support and having its piston rod 46 connected at one end to the trap, the cylinder of course being disposed out of the way of the crop ends so as not to interfere with their passage into the pit.

The cylinder has fluid connections 47 communicating with a source of fluid under pressure through suitable valves (not shown) controlled by the operator and the trap may thus be raised and lowered as desired by admitting the actuating fluid to the cylinder or exhausting it therefrom. When the trap is lowered its top surface lies slightly below the plane of the tops of the conveyor rollers of table T' and thus offers no obstruction to the passage of a strip along this table over the trap, but when it is raised it is effective to direct into the pit anything moving toward it along the table.

Operation

The mechanism herein described, when used in the continuous strip mill to which reference has been made, enables the operator to dispose of the front crop end of a strip by removing it from the path of the latter by merely operating cylinders 18 and 44. More particularly, prior to the arrival of the front end of the strip at the shear, roll 2 is lowered and the pass between rolls 1 and 2 adjusted so it will be equal to or preferably slightly less than the thickness of the strip by turning hand wheel 30 in the proper direction, and trap 40 is raised by operation of cylinder 44. As has been mentioned, rolls 1 and 2 are kept rotating at a peripheral speed considerably greater than the linear speed at which the strip is delivered from the last work rolls R and as its forward end is directed through the shear, the latter is operated in the usual way to cut the front crop end from the strip. As the shear completes this operation it throws the severed crop end forwardly out on guide table G toward rolls 1, 2, the guard 9 insuring its entrance between them, and, since substantially the full weight of roll 2 bears against the crop end as it passes between the rolls, its linear speed is materially accelerated thereby. It is consequently ejected forwardly along table T' at a linear speed substantially corresponding to the peripheral speed of rolls 1 and 2 and thus at a greater linear speed than that at which the main body of the strip is moving from the work rolls so that it reaches trap 40 an appreciable time before the front end of the main strip, which of course has maintained its normal rate of speed, reaches that point. The trap 40, being raised, lies in the path of the moving crop end and thus deflects it into the subjacent pit, and as soon as it has entered the latter the trap is closed by operation of cylinder 44 so that as the main strip moves out along table T' in the normal manner it passes over the closed trap without any interference from it.

Due to their greater peripheral speed, rolls 1 and 2, if the latter be left in lowered position after they impel the crop end forward, exert a moderate tension on that portion of the strip extending between them and rolls R, and it is usually desirable that they be operated in this manner, especially when lighter gauges of strip are being rolled, as this tension effectively prevents the strip from becoming bunched up or "cobbled" in front of the shear. Furthermore if the coiler or other apparatus for receiving the strip from table T' operates to withdraw it from the latter less rapidly than it is delivered from rolls R, it is projected by rolls 1, 2 onto table T' in such way as to accumulate thereon in folds or layers, forming harmless loops which are later pulled out gradually by the receiving mechanism without injury to the strip in any way.

As the rear end of the strip passes through the shear its back crop end is usually cut off, but there is generally less occasion to remove this crop rapidly from the strip path than in the case of the front crop end, and as the strip may overlie trap 40 for an appreciable time after its back crop end is cut off, it is usually preferable to raise the roll 2 by operation of cylinder 18 either immediately after disposition of the front crop end or just before the back crop end reaches it so the latter is not sent forward rapidly, as was the front crop end, but moves toward trap 40 at the normal conveying speed of table T' thus allowing time for the strip to clear or nearly clear the trap before it is necessary to raise it to receive the back crop end. Of course, if the strip is removed from table T' rapidly enough, or the back crop end is kept behind rolls 1, 2 for sufficient time, the crop end may be disposed of by using rolls 1, 2 in the same way as in the case of the front crop end.

It will now be apparent that the mechanism herein described is simple in its nature, embodies no complicated or delicate parts likely to be damaged or rendered unserviceable in normal use over a long period, and is readily repaired and/or taken apart and reassembled when required. Moreover, as the expense involved in its maintenance and operation is relatively low, especially as compared with the old practice of manually removing the crop ends from the path of the strip, and as it performs its intended functions in a highly satisfactory manner, it can advantageously be incorporated in strip mills already in use as well as in those now being or hereafter to be installed.

While the shear, pinch rolls and other apparatus have been shown herein as positioned fairly close to a strip mill, it will be appreciated that their respective positions in relation to the mill or other means for progressively delivering and receiving the strips are largely matters of choice or convenience, and further that it is immaterial whether the strip be delivered from a rolling mill, uncoiling mechanism or any other source so long as it is moved into and along a substantially straight path in which the mechanism embodying the invention is interposed.

It will be understood that while I have herein described in some detail certain mechanism constructed in accordance with the invention, I do not desire or intend to limit or confine myself thereto in any way as changes and modifications in the form and arrangement of the several units and individual parts as well as in the practice of the method comprehended by the invention may readily be made without departing from the spirit and scope thereof as defined in the appended claims.

Having thus described my invention, I claim and desire to protect by Letters Patent of the United States:

1. In combination with means for delivering a hot metal strip, a shear adjacent the path of the strip as it is delivered from said means adapted to sever the leading end from the main body of the strip and a run-out table for receiving said severed end and the strip after passing the shear, means including a surface moving at a peripheral speed greater than the linear speed of the strip for imparting to the severed end a greater speed of progression along the table than the normal movement of the strip therealong.

2. In combination with means for delivering a hot metal strip, a shear adjacent the path of the strip as it is delivered from said means adapted to sever the leading end from the main body of the strip and a run-out table for receiving said severed end and the strip after passing the shear, means including a surface engageable with the severed end and moving at a greater speed than the strip for imparting to said end a greater speed of progression along the table than the normal movement of the strip therealong, and means projectable into said path to deflect the severed end therefrom.

3. In combination with means for delivering a hot metal strip at a predetermined speed of the order of about 1500 feet per minute, a shear adjacent the path of the strip as it is delivered from said means adapted to sever the leading end from the main body of the strip and a run-out table for receiving said severed end and the strip after passing the shear, means including a peripheral surface moving at a greater speed than the strip for imparting to the severed end a greater speed of progression along the table than the normal movement of the strip therealong, and means projectable into said path to deflect the severed end therefrom and adapted when retracted from said path to clear the same for the passage of the strip.

4. In combination with means for progressively delivering an elongated hot metal strip along a substantially rectilinear path, a shear adjacent said path operable to sever the leading end from the moving strip, a run-out table beyond the shear for receiving said severed end and the strip, and means comprising a pair of pinch rolls on that side of the shear remote from the first means adapted to be driven at a peripheral speed greater than the linear speed of the strip to project the severed end along the table at a higher speed than the normal travel of the strip thereover.

5. In combination with means for progressively delivering an elongated hot metal strip along a substantially rectilinear path, a shear adjacent said path operable to sever the leading end from the moving strip, a run-out table beyond the shear for receiving said severed end and the strip, a pair of pinch rolls disposed on that side of the shear remote from said means adapted to receive the severed end of the strip, and means for driving said rolls at a peripheral speed greater than the normal linear speed at which the strip is delivered from the first means to thereby accelerate the movement of said severed end as it passes through the rolls.

6. In combination with means for progressively delivering an elongated hot metal strip along a substantially rectilinear path, a shear adjacent said path operable to sever the leading end from the moving strip, a run-out table beyond the shear for receiving said severed end and the strip, a pair of pinch rolls disposed on that side of the shear remote from said means adapted to receive the severed end of the strip, means for driving said rolls at a peripheral speed greater than the normal linear speed at which the strip is delivered from the first means to thereby accelerate the movement of said severed end as it passes through the rolls, and means projectable into the path of said severed end along the table adapted to deflect it therefrom.

7. In combination with a hot strip mill adapted to progressively deliver a rolled hot metal strip along a substantially rectilinear path, a shear adjacent said path operable to sever the leading end from the moving strip, a run-out table beyond the shear for receiving said severed end and the strip, a pair of pinch rolls disposed on that side of the shear remote from the mill adapted to receive the leading end of the strip, means for driving said rolls while in contact with the strip at a peripheral speed greater than the normal linear speed at which the strip is delivered from the mill to thereby accelerate the movement of said end as it passes through the rolls after severance, and means projectable into the path of the severed end along the table adapted to deflect it therefrom and retractable from said path to thereby clear it for the passage of the strip after the deflection of the severed end.

8. In combination with means for progressively delivering an elongated hot metal strip and a run-out table adapted to receive the strip, a pair of pinch rolls arranged above and below the path of the strip between said means and the table adapted to engage the strip as it passes thereto, means for driving the rolls at a peripheral speed greater than the linear travel of the strip, and means for adjustably varying the space between the rolls in accordance with the thickness of the strip whereby the rolls are operable to maintain the strip in tension between them and the first means when adjusted to respectively bear on the faces of the strip.

9. In combination with a strip mill adapted to progressively deliver a rolled strip and a run-out table adapted to receive the strip, a pair of pinch rolls arranged above and below the path of the strip between the mill and the table adapted to engage the strip as it passes thereto, means for driving the rolls at a peripheral speed greater than the linear travel of the strip, and means for adjustably varying the space between the rolls in accordance with the thickness of the strip comprising a supporting member, a yoke carried thereby, a pair of arms pivoted to the member for vertical movement and supporting one of the rolls, means interconnecting the arms and the yoke, and means operable to move the yoke vertically on the supporting member.

10. In combination with a strip mill adapted to progressively deliver a rolled strip and a run-out table adapted to receive the strip, a pair of pinch rolls arranged above and below the path of the strip between the mill and the table adapted to engage the strip as it passes thereto, means for driving the rolls at a peripheral speed greater than the linear travel of the strip, and means for adjustably varying the space between the rolls in accordance with the thickness of the strip comprising a supporting member, a yoke carried thereby, a pair of arms pivoted to the member for vertical movement and supporting one of the rolls, means interconnecting the arms and the yoke, and means operable to move the yoke vertically on the supporting member, said interconnecting means comprising a cylinder carried by the yoke, and a fluid actuated piston therein having a piston rod connected with said arms whereby the latter can be moved vertically about their pivots by actuation of the piston in any adjusted position of the yoke on the supporting member.

11. In mechanism of the class described, a supporting member providing vertical ways, a yoke slidable in said ways, means for adjusting the position of the yoke therein, a cylinder carried by the yoke, a fluid actuated piston therein and a piston rod extending therefrom, a pair of pinch rolls one of which is journaled for rotation in a fixed position, a pair of arms supporting the other roll and carried by and vertically movable with respect to the supporting member, and means interconnecting said rod and arms whereby when the piston is at the end of its travel in one direction in the cylinder the rolls are in greatest proximity and subsequent movement of the piston is operative to separate the rolls, the adjusted position of the yoke in the ways determining the space between them when the piston is in said position.

12. In mechanism of the class described, a supporting member providing vertical ways, a yoke slidable in said ways, means for adjusting the position of the yoke therein, a cylinder carried by the yoke, a fluid actuated piston therein and a piston rod extending therefrom, a pair of pinch rolls one of which is journaled for rotation in a fixed position, a pair of arms supporting the other roll and carried by and vertically movable with respect to the supporting member, means interconnecting said rod and arms whereby when the piston is at the end of its travel in one direction in the cylinder the rolls are in greatest proximity and subsequent movement of the piston is operative to separate the rolls, the adjusted position of the yoke in the ways determining the space between them when the piston is in said position, and means interconnected with the yoke and movable in accordance with its movement in the ways affording a visible indication of the width of said space as determined by the adjusted position of the yoke.

13. In mechanism of the class described, a supporting member providing vertical ways, a yoke slidable in said ways, means for adjusting the position of the yoke therein, a cylinder carried by the yoke, a fluid actuated piston therein and a piston rod extending therefrom, a pair of pinch rolls one of which is journaled for rotation in a fixed position, a pair of arms supporting the other roll and carried by and vertically movable with respect to the supporting member, means interconnecting said rod and arms whereby when the piston is at the end of its travel in one direction in the cylinder the rolls are in greatest proximity and subsequent movement of the piston is operative to separate the rolls, the adjusted position of the yoke in the ways determining the space between them when the piston is in said position, rack teeth on the yoke, a pinion on the supporting member cooperative therewith, and an arm carried by the pinion and adapted for oscillation therewith to indicate the space between the rolls as determined by the adjusted position of the yoke.

14. In combination with a strip mill, a shear adapted to crop the leading end from a strip as it is projected from the mill and a run-out table leading from the shear forming a path for the crop end and the following strip, crop end receiving means interposed in the table remote from the shear comprising a vertically movable trap aligned with said path adjacent an opening in the table, and means for raising the trap to intersect the path and thereby position it to deflect the crop end therefrom through the opening and for lowering it below the path to thereby clear the latter for the subsequent passage of the strip.

15. The method of removing from the path of a progressively moving hot metal strip the leading end thereof after severance therefrom which comprises accelerating the normal rate of progression of the severed end along said path toward a predetermined station, interposing in said path at the station means adapted to deflect the severed end therefrom and then withdrawing said means from the path prior to the arrival at the station of the leading end of the main body of the strip.

16. The method of removing from the path of a progressively moving hot metal strip the leading end thereof after severance therefrom which comprises the steps of imparting to said severed end a more rapid movement along the path than that of the main body of the strip, deflecting said end from the path at a predetermined station prior to the arrival of the leading end of the strip and then continuing the movement of the latter past the station along said path.

17. The method of disposing of the front crop end sheared from a hot metal strip while the latter is moving along a predetermined path at a uniform linear speed of the order of about 1500 feet per minute which comprises accelerating movement of the severed crop end along the path and in advance of the strip, and then deflecting it from said path prior to the arrival of the strip at the station at which such deflection takes place preparatory to moving the strip in said path past said station.

18. The method of disposing of the front crop end of a hot metal strip moving in a predetermined path at a uniform linear speed of the order of about 1500 feet per minute which comprises accelerating the rate of movement of the severed crop end along said path in advance of the strip, and then deflecting the crop end from said path to clear it for the subsequent passage of the strip.

GEORGE F. PAUL.